United States Patent [19]
Curtis

[11] 4,434,993
[45] Mar. 6, 1984

[54] ASSEMBLY FOR ATTACHMENT TO A VEHICLE FOR PERFORMING A WORK OPERATION

[75] Inventor: Stanley F. Curtis, Exeter, Calif.

[73] Assignee: Pollution Controls Industries, Inc., Tulare, Calif.

[21] Appl. No.: 343,170

[22] Filed: Jan. 27, 1982

[51] Int. Cl.³ .............................................. B60P 3/12
[52] U.S. Cl. .................................... 280/402; 414/563
[58] Field of Search ................. 280/402, 418; 414/563

[56] References Cited

U.S. PATENT DOCUMENTS

| | | | |
|---|---|---|---|
| 3,740,074 | 6/1973 | Coil | 280/402 |
| 3,885,815 | 5/1975 | Kniff | 280/402 |
| 3,984,120 | 10/1976 | Boveia | 280/402 |
| 4,047,733 | 9/1977 | Parkes | 414/563 |
| 4,103,799 | 8/1978 | Perez | 414/563 |
| 4,186,938 | 2/1980 | Youngblood | 414/563 |

*Primary Examiner*—John A. Pekar
*Assistant Examiner*—D. Lynn Fugate
*Attorney, Agent, or Firm*—Huebner & Worrell

[57] ABSTRACT

An assembly for adjusting first and second portions of a vehicle relative to each other, the assembly having a main frame adapted to be secured on the first portion of the vehicle in fixed relation thereto with the second portion of the vehicle above the main frame in an unadjusted relationship; a subframe mounted on the main frame in upstanding relation adjacent to the second portion of the vehicle; and a belt interconnecting the main frame and subframe and being tensionable to engage the second portion of the vehicle in supporting relation thereto.

4 Claims, 4 Drawing Figures

ASSEMBLY FOR ATTACHMENT TO A VEHICLE FOR PERFORMING A WORK OPERATION

BACKGROUND OF THE INVENTION

1. Field of the Invention

The present invention relates to an assembly for attachment to a vehicle for performing a work operation and more particularly to such an assembly which can rapidly and dependably be employed to install a trailer hitch, tow bar or the like on a vehicle in such a manner that the vehicle can be transported with the wheels and body thereof disposed in the optimum relative positions for such transport cushioned against damage resulting therefrom.

2. Description of the Prior Art

When vehicles are drawn in trailing relation to a towing vehicle, the driven wheels thereof must ordinarily be elevated from ground engagement. A variety of types of trailer hitches are in use which make this possible. However, because of the abnormal attitude in which the vehicle is transported and the stiff suspension of the towing vehicle, the transmission and magnification of road shock to the vehicle being towed creates a substantial risk of damgage. For example, the inherent play between the body and wheels of the vehicle permitted by its suspension, may cause damage to the suspension, running gear and frame of the vehicle. In addition, such cosmetic features as the bumper and body moldings can be damaged by impacting with the towing assembly. If the vehicle is towed from the rear, there is also a risk of damage to the fuel tank and exhaust system of the vehicle.

Therefore, it has long been known that it would be desirable to have an assembly which permits a vehicle to be towed either forwardly or rearwardly in such a manner as to prevent damage to the various portions of the vehicle during such transport and yet which is easy to install and does not in any way interfere with the towing operation.

SUMMARY OF THE INVENTION

Therefore, it is an object of the present invention to provide an improved assembly for use in towing a vehicle.

Another object is to provide such an assembly which is adapted for adjusting first and second portions of a vehicle relative to each other for towing.

Another object is to provide such an assembly which has particular utility in adjusting the wheels and body of a vehicle relative to each other for transport in towing relation to a towing vehicle so that the vehicle being towed is substantially protected from damage by road shock during such transport.

Another object is to provide such an assembly which operates to cradle the relatively delicate portions of the body during such transport so as to distribute the supporting force over several portions of the body and thus minimize the risk of damage to any particular portion thereof and which similarly automatically adjusts to stresses and strains within the vehicle in a protective fashion.

Another object is to provide such an assembly which is adapted for attachment to virtually any type of vehicle for towing either forwardly or rearwardly and which is fully adjustable for precisely fitting each such vehicle.

Another object is to provide such an assembly which is adapted for use in conjunction with virtually any type of trailer hitch, tow bar or the like.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
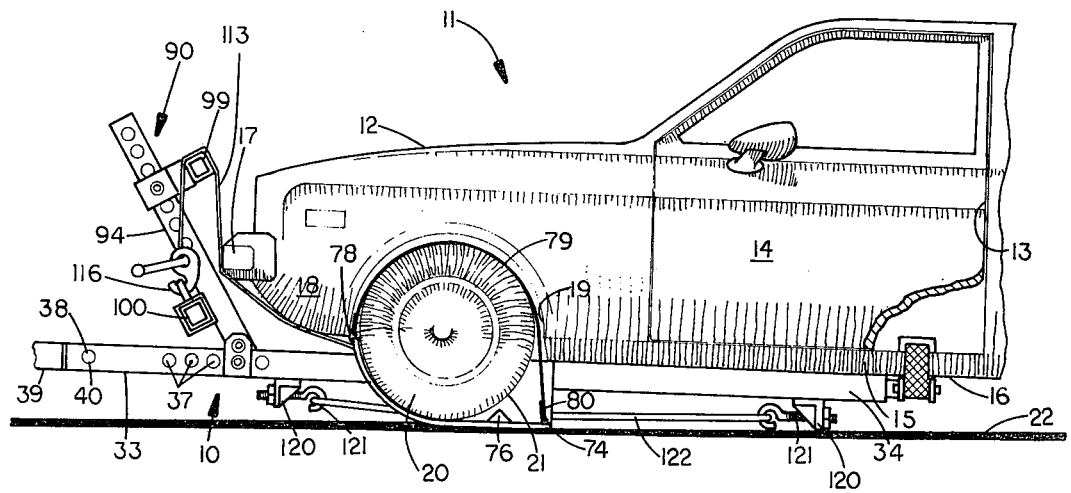
FIG. 1 is a fragmentary side elevation of the assembly of the present invention shown installed on a vehicle prior to being elevated into a towing position.

Referring more particularly to the drawings, the assembly of the present invention is generally indicated by the numeral 10 of FIG. 1. The assembly is shown in FIG. 1 in a typical operative environment mounted on a vehicle 11. The vehicle has a body 12 having doorways 13 in which side doors 14 are individually mounted. The body has a lower body portion or floorboard 15 with an underside 16.

The vehicle 11 has a front bumper 17 mounted on the body 12. For purposes of illustrative convenience, it will be understood that the body has underbody molding 18 beneath the front bumper. The body has wheel wells 19 in which are individually mounted the front wheels 20 of the vehicle. The wheels are mounted in the conventional manner connected to the body and chassis of the vehicle through a suspension system, not shown, which permits play between the wheels and body. The front wheels individually have peripheral surfaces or tread 21 extending thereabout. As shown in FIG. 1, the earth surface is indicated at 22.

As disclosed and claimed herein, the front wheels 20 will sometimes herein be referred to as the first portion of the vehicle and the body 12 as the second portion of the vehicle.

Figure 3:
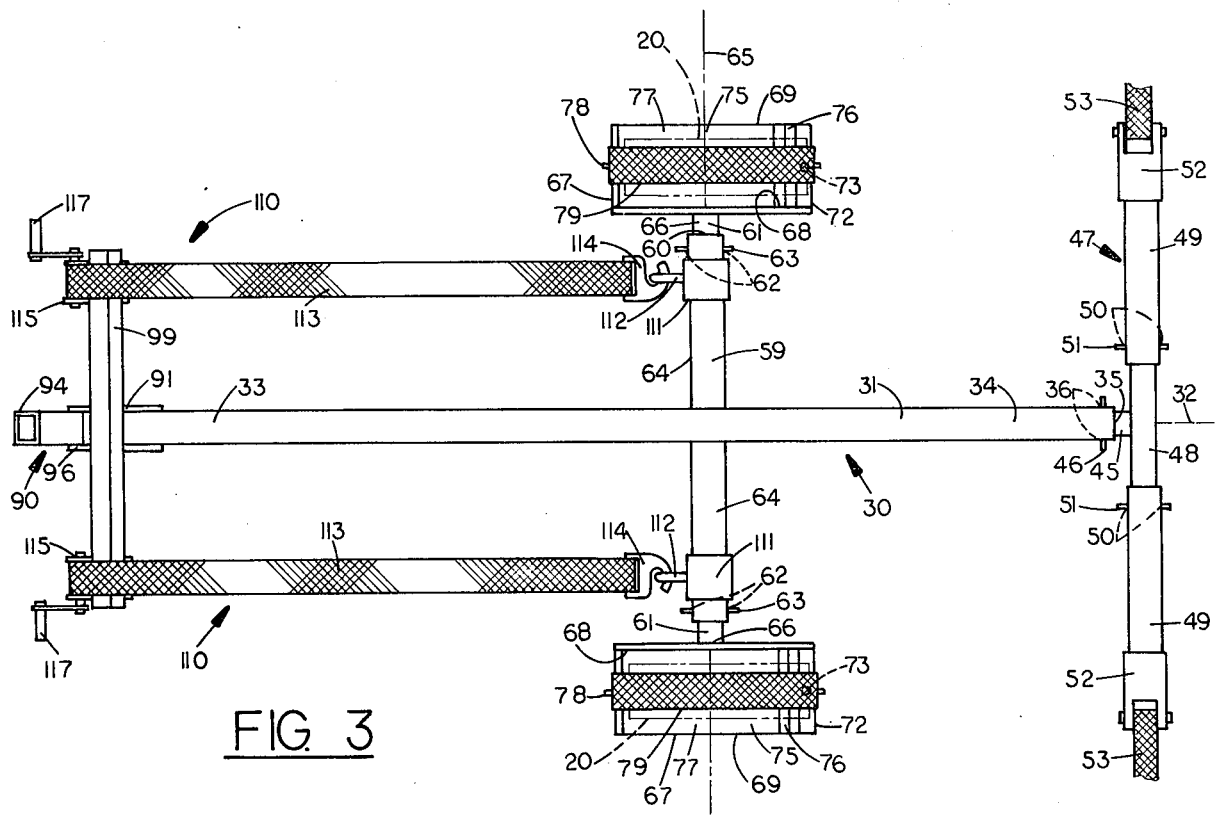
FIG. 3 is a fragmentary top plan view of the assembly with the mast thereof adjusted to the forwardmost position.
Figure 4:
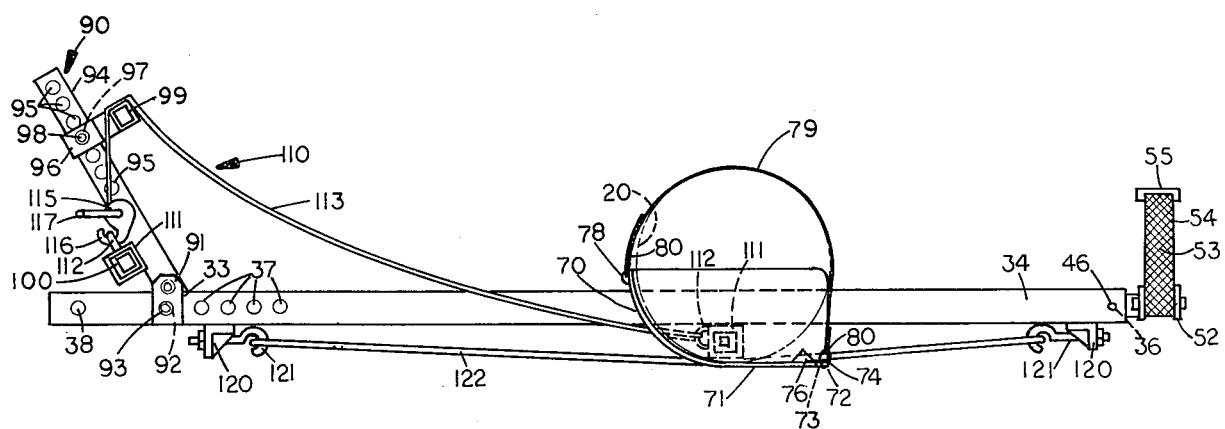
FIG. 4 is a side elevation of the assembly of FIG. 3.

The assembly 10 has a main frame 30, best shown in FIG. 3. The main frame has a longitudinal beam 31 which is preferably square section tubing. The longitudinal beam has a longitudinal axis 32 with a forward end portion 33 on the left, as viewed in FIG. 3, and an opposite rearward end portion 34 on the right, as viewed in FIG. 3. A longitudinal passage 35 extends through the longitudinal beam and through the forward and rearward end portions thereof. A pair of pin holes 36 are formed in the rearward end portion 34 of the longitudinal beam defining a common axis right-angularly related to the longitudinal axis 32 of the beam 31. Similarly, a plurality of subframe mounting holes 37 extend through the forward end portion 33 of the longitudinal beam in pairs to define individual axes right-angularly related to the longitudinal axis 32 of the beam, as best shown in FIG. 4. A pair of hitch mounting holes 38 extend through the forward end portion 33 of the longitudinal beam 31 similarly defining an axis right-angularly related to the longitudinal axis 32 of the beam. For illustrative convenience, a hitch 39 is fragmentarily shown in FIG. 1 slidably received in the longitudinal passage 35 and releasibly held in position by a locking pin 40 extending through the holes 38 and hitch 39. It will be understood that any suitable appliance such as a tow bar, hitch, or the like can be employed for this purpose.

A telescoping beam 45 is slidably received within the longitudinal passage 35 of the rearward end portion 34 of the beam 31, as best shown in FIG. 3. The telescoping beam 45 is preferably of square section tubing dimensioned slidably to be received in the longitudinal passage 35 of the beam 31 so as to permit it to be adjusted inwardly or outwardly of the longitudinal beam 31 along the axis 32, but not rotated about the longitudinal axis. A plurality of holes, not shown, are extended through the telescoping beam 45 in pairs with the holes of each pair aligned along axes right-angularly related to the longitudinal axis 32 of beam 31. A locking pin 46 is extended through the pin holes 36 of the longitudinal beam 31 and through a selected pair of the holes, not shown, in the telescoping beam so as to lock the telescoping beam in a selected position relative to the longitudinal beam.

A belt assembly 47 is mounted on the outwardly extending end of the telescoping beam 45 in right angular relation to the longitudinal axis 32 of the beam 31. The belt assembly has a transverse beam 48 individually mounting telescoping arms 49 on the opposite ends thereof. Each of the telescoping arms has a pair of pin holes 50 extending therethrough and defining an axis parallel to the longitudinal axis 32 of the beam 31. Locking pins 51 individually extend through the pin holes 50 and through one of a series of pairs of corresponding holes in the opposite ends of the transverse beam, not shown, to lock the telescoping arms in selected positions extending in opposite directions outwardly from the longitudinal axis 32 of the beam 31. Each of the telescoping arms 49 mounts a belt mount 52 at the distal end thereof on which, in turn, is mounted a belt 53. The belts 53 of the telescoping arms have corresponding free end portions 54 remote from the belt mounts which can be interconnected using a suitable fastener 55 such as a ratchet type belt tightener to secure the main frame 30 on the vehicle 11 in the manner shown in FIG. 1 and hereinafter to be described.

The main frame 30 has a central transverse beam 59 mounted, as by welding, on the longitudinal beam 31 in right angular relation to the longitudinal axis 32 thereof. The central transverse beam has a longitudinal passage 60 in which, at opposite ends, are received telescoping beams 61. The central transverse beam 59 and the telescoping beam 61 are preferably of the square section tubing type with the telescoping beams dimensioned for slidable movement within the longitudinal passage 60 of the central transverse beam. The beam 59 and telescoping beam 61 are also preferably fitted so they cannot rotate axially relative to each other. The central transverse beam has a pair of pin holes 62 adjacent to each opposite end thereof aligned to define axes parallel to the longitudinal axis 32 of the longitudinal beam 31. The telescoping beam 61 each has a series of pairs of pin holes, not shown, extending therethrough. Accordingly, the telescoping beams 61 can be selectively positioned within the longitudinal passage of the transverse beam and held in the positions selected using a pair of locking pins 63 individually extending through the pairs of pin holes selected and the pin holes 62 of the central transverse beam. Thus, the main frame is provided with a pair of telescoping arms 64, composed of the central transverse beam 59 and the telescoping beams 61, on opposite sides of the longitudinal beam 31 which can be extended and contracted along a longitudinal axis 65 which is right-angularly related to the longitudinal axis 32 of the longitudinal beam 31.

The telescoping arms 64 have distal end portions 66 individually mounting receptacles or wheel housings 67. Each of the wheel housings has an interior wall 68 defining a plane right-angularly related to the longitudinal axis 65. Each of the wheel housings has a floor 69 mounted on the interior wall and having an arcuate portion 70 continuous with a flat portion 71. The flat portion has a trailing edge 72 extending in the general direction of the belt assembly 47. A hole 73 is formed in the floor portion 71 adjacent to the trailing edge thereof. A ring 74 is extended through a hole 73 of each wheel housing, as best shown in FIGS. 1 and 4. The floor 69 of each housing has an interior surface 75 on which is mounted a stop or ridge 76 in adjacent spaced relation to the trailing edge 72. The interior wall, floor and ridge 76 of each wheel housing define a receptacle or chamber 77. A ring 78 is secured by welding on the arcuate portion 70 of the floor 69, as best shown in FIG. 4. A belt 79 having hooks 80 at the opposite ends thereof is secured by one of its hooks on the ring 78 of each wheel housing. The hook at the opposite end of each belt is adapted to be secured on the ring 74 borne by the trailing edge 72 of its respective wheel housing.

The assembly 10 has a mast or subframe 90 mounted on the main frame 30 in upstanding relation on the forward end portion 33 thereof, as best shown in FIG. 4. The subframe has a mount 91 slidably received on the forward end portion 33 of the longitudinal beam 31. The mount has a pair of holes 92 defining a common axis extending in right angular relation to the longitudinal axis 32 of the longitudinal beam 31 and positioned so as to be positionable in precise alignment with a selected pair of the subframe mounting holes 37. A mounting pin 93 is adapted to be inserted through the pairs of holes 92 and 37 so as to mount the subframe in upstanding relation at the selected position desired along the forward end portion of the longitudinal beam. An upright beam 94 is secured on the mount 91 at an oblique angle with respect to the longitudinal beam. A plurality of pairs of pin holes 95 extend through the beam along the length thereof. A mount 96 is slidably received on the upright beam 94 and has a pair of pin holes 97 extending therethrough in position for precise alignment within a selected pair of the pin holes 95 in the upright beam. A locking pin 98 is adapted to be received in the pin holes 97 and a selected pair of the pin holes 95 to secure the mount in a selected position on the upright beam. An upper cross bar 99 is mounted, as by welding, on the mount 96 in right angular relation to the upright beam and the longitudinal axis 32 of the longitudinal beam 31. A lower cross bar 100 is mounted, as by welding on the upright beam immediately adjacent to the mount 91 thereof and extending parallel to the upper cross bar 99.

Figure 2:
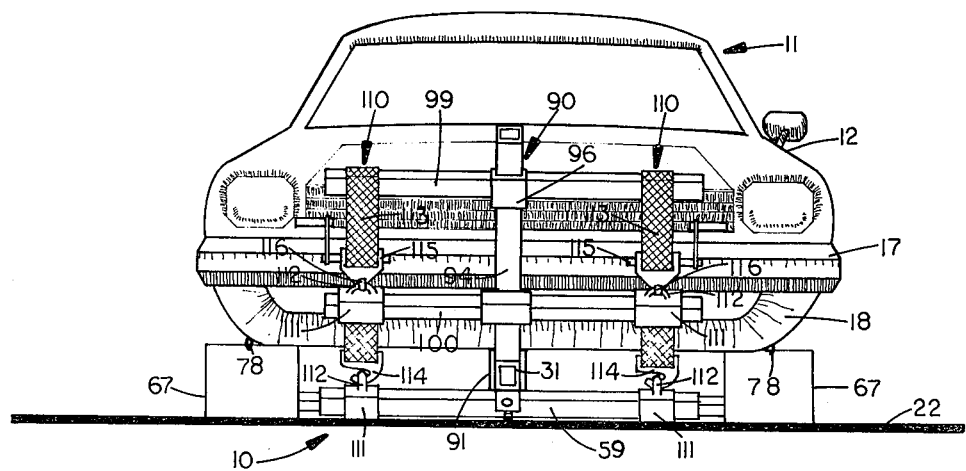
FIG. 2 is a fragmentary front elevation of the assembly and vehicle viewed in FIG. 1.

The assembly 10 has a pair of suspension assemblies 110. Each suspension assembly has a pair of slide collars 111. One slide collar of each pair is slidably received on the central transverse beam 59 for slidable movement therealong and the other slide collar of each pair is slidably received on the corresponding end of the lower cross bar 100 of the subframe 90. The slide collars of each suspension assembly are positioned on corresponding sides of the longitudinal beam 31, as best shown in FIG. 2. A ring 112 is affixed, by welding, on each slide collar. A tensionable belt or member 113 has a hook 114 at one end thereof extending through the ring 112 of the slide collar 111 mounted on the central transverse beam of that respective suspension assembly. The belt extends upwardly over the upper cross bar 99 of its respective side of the longitudinal beam 31 and downwardly to a reel 115 having a hook 116 received in the ring 112 of the slide collar 111 of that suspension assembly mounted on the lower cross bar 100. The reel has a crank 117 operable to pay out or reel in the tensionable belt, for purposes hereinafter to be described, and to hold the belt in the position selected using a suitable internal ratchet mechanism or the like.

As used in the specification and claims of this patent application, the words "tension", "tensionable", "tensioning" and the like can, but do not necessarily mean to stretch in the sense of elasticity. These words, as used herein, broadly mean to make taut, or, in other words, to remove slack therefrom.

A pair of mounts 120 are individually secured by welding on the underside of the longitudinal beam 31 on the forward and rearward end portions 33 and 34 respectively thereof. Each mount has eye bolt and nut assemblies 121 secured thereon for endward adjustment by loosening or tightening of the nut thereof. A cable 122 interconnects the eye bolt and nut assemblies 121 of the mounts 120 extending downwardly about the underside of the central transverse beam 59. Thus, by tightening the eye bolt and nut assemblies, the strength of the longitudinal beam can be reinforced to provide additional strength in the assembly 10 during use. Loosening of the eye bolt and nut assemblies relieves the stress placed on the longitudinal beam 31 when it is not in use.

OPERATION

The operation of the described embodiment of the subject invention is believed to be clearly apparent and is briefly summarized at this point. When it is desired to use the assembly 10, the assembly is positioned on the earth surface 22 as shown in the drawings. The belts 53 of the belt assembly 47 are disengaged from the fastener 55 and individually laid laterally in opposite directions from the longitudinal beam 31. Similarly, the belts 79 of the wheel housings 67 are disengaged from the rings 74 of their respective wheel housings and draped away from the housings so as to leave the chambers 77 thereof fully exposed.

Depending upon the width of the vehicle 11, the locking pins 51 are removed from the pin holes 50 from the telescoping arms 49 to permit the arms to be adjusted laterally of the longitudinal beam 31 so as to match the width of the body 12 of the vehicle. Subsequently, the locking pins 51 are again inserted in the pin holes 50 of their respective telescoping arms and through the selected holes of the transverse beam 48 to secure the telescoping arms in the selected positions. Similarly, the locking pins 63 of the telescoping beams 61 are removed from the pin hole 62 and the wheel housings 67 adjusted to match the distance between the front wheels 20 of the vehicle. Subsequently the locking pins 63 are again reinserted through their respective pin holes 62 and the corresponding holes in the central transverse beam 59 so as to secure the wheel housings in the spaced relationship selected.

The telescoping beam 45 can be adjusted outwardly or inwardly along the longitudinal axis 32 of the longitudinal beam 31 so as to position the belt assembly 47 in the optimum position for extension through the doorways 13 of the vehicle 11. This is accomplished by removing the locking pin 46 from the pin holes 36 of the longitudinal beam 31 and slidably repositioning the telescoping beam in the longitudinal passage 35 of the longitudinal beam. The locking pin 46 is then reinserted in the pin holes 36 of the longitudinal beam and the selected holes of the telescoping beam to lock it in the position selected.

The slide collars 111 of each suspension assembly 110 can be slidably positioned along their respective central transverse beam 59 and lower cross bar 100 so as to position the tensionable belt 113 thereof in the position most suited to the specific vehicle 11 on which the assembly 10 is to be mounted.

Subsequently, the operator drives the vehicle 11 forwardly over the belt assembly 47 and in straddling relation to the longitudinal beam 31 until the front wheels 20 are individually fully received within the chambers 77 of the wheel housings 67, as shown in FIGS. 1 and 2. The operator will, of course, know when this position has been reached when resistance is felt by contact of the front wheels with the arcuate portions 70 of the wheel housings. The ridges 76 of the wheel housings operate to resist movement of the wheels from the chambers once the wheels are received therein. The operator then extends the belts 79 about the treads 21 of their respective wheels and secures the hooks 80 thereof on the rings 74 so as firmly to secure the wheel housings on their respective front wheels.

Similarly, the operator opens the side doors 14 of the vehicle 11 and extends the belts 53 of the belt assembly 47 through the doorways 13 and about the floorboard 15 of the vehicle, as shown in FIG. 1. Using the fastener 55, the belts are tightened about the floorboard so that the transverse beam 48 and telescoping arms 49 of the belt assembly 47 are firmly secured on the underside of the body 16. The doors can then be closed as desired.

The operator can adjust the height of the upper cross bar 99 if desired, this is accomplished by removing the locking pin 98 from the pin holes 97 of the mount 96 and moving the upper cross bar upwardly or downwardly along the upright beam 94 to the desired pair of pin holes 95 in the upright beam. Reinsertion of the locking pin 98 thereby secures the upper cross bar 99 in the selected position.

Subsequently, the operator, using the crank 117, operates the reels 115 of the suspension assemblies 110 to reel in the tensionable belts 113. As this is accomplished, the belts extend about the underbody molding 18 and front bumper 17 of the vehicle so as substantially to conform to the underside of the vehicle. During such tightening, the operator can, if desired, move the slide collars 111 of either or both of the suspension assemblies 110 so that the belts engage the strongest and least easily damaged portions of the underside of the vehicle. As can best be seen in FIG. 1, the tensionable belts are tightened until the body 12 of the vehicle is adjusted relative to the wheels 20 thereof as desired. In most instances, optimum adjustment will be such as to maintain the body and the wheels in the spaced relationship existent during normal use of the vehicle. However, greater spacing can be achieved by tightening of the tensionable belts if desired. As can best be visualized in FIG. 1, since the belts engage virtually the entire underside of the front of the body 12, the load is distributed evenly and adjusts automatically so as to reduce to an absolute minimum the risk of damage as a result of such installation. In most instances, however, the greatest portion of the weight is, in effect, borne by the front bumper as can be visualized in FIG. 1.

As disclosed and claimed herein, the points of contact of the wheel housings 67 with the wheels are sometimes referred to as a first point of reference and the point of contact of the tensionable belts 113 with the upper cross bar 99 as a second point of reference.

Subsequently, the hitch 39 is secured on the forward end portion 33 of the longitudinal beam 31 using the locking pin 40. Thereafter, depending upon the particular type of hitch and method of installation, the hitch 39 and forward end portion 33 of the longitudinal beam 31 are elevated to raise the front wheels 20 of the vehicle 11 and the assembly 10 out of engagement with the earth surface 22 for transport on the rear wheels not shown, of the vehicle. The vehicle can then be towed in trailing relation to a towing vehicle substantially without risk of damage to the vehicle being towed. Since the tensionable belts 113 engage substantially the entire underside of the front of the vehicle, damage to such portions of the vehicle is reduced to an absolute minimum even during severe jarring as a result of road transport. Such damage is prevented due to even distribution of the weight on the belt and the ability of the belt automatically to adjust to changes in attitude and to absorb road shock received during such transport. Similarly, the belt assembly 47 adjusts and shifts during such transport so as to accommodate and absorb stresses and strains which, in prior art devices, would commonly cause damage either to the vehicle or to the device itself.

It will be apparent that the assembly 10 can also operate in the manner described by being mounted on the rear of the vehicle. This will normally be done Where the rear wheels of the vehicle are the driven wheels. Such installation is achieved by simply backing the vehicle into position with the rear wheels received in the wheel housings 67, as described, and the belts 79 extended about the tread of the wheels and secured in position by the hooks 80 received in the rings 74 of the wheel housings. Similarly, the belt assembly 47 is secured on the floorboard 15 of the vehicle by extension through the doorways 13 of the vehicle in the manner already described. The belt assembly can be adjusted to position the belts 53 for extension through the doorways by removal of the locking pin 46 to permit the telescoping beam 45 to be adjusted inwardly or outwardly of the rearward end portion 34 of the longitudinal beam 31. Repositioning of the locking pin 46 then secures the belt assembly in the selected position.

Similarly, the suspension assemblies 110 are adjusted to the optimum positions on the vehicle by movement of the slide collars 111. The tensionable belts 113 are tightened, using the reels 115, into engagement with the rear bumper and rear underbody molding of the vehicle in the manner already described with respect to the vehicle as shown in FIG. 1.

As can be seen in FIG. 1, the subframe 90 is preferably mounted on the longitudinal beam 31 so that the precise point of mounting of the upright beam 94 is to the right, as viewed in FIG. 1, of the point of engagement of the front bumper 17 with the tensionable belts 113. This reduces the tendency of the subframe 90 to be pulled about the point of mounting and into the vehicle which would break the assembly 10 and perhaps also damage the vehicle. Thus, the point of mounting is, in a longitudinal frame of reference, between the point of engagement of the bumper with the belts 113 and the first point of reference and, in a vertical frame of reference, below the second point of reference. It will be understood that "point of engagement" refers to the point on the belts at which the major portion of the weight of the body of the vehicle is supported. This is usually the bumper. However, if the vehicle has no bumper and/or there is another point at which the major portion of the weight of the body of the vehicle is supported, it is this point to which "point of engagement" refers.

Therefore, the assembly of the present invention operates to permit first and second portions of the vehicle to be adjusted relative to each other for transport in trailing relation to a towing vehicle operating to maintain the selected relationship during such transport and minimizing damage to the vehicle and to the assembly as a result of road shock by absorbing such shock during use and is fully adaptable for attachment to virtually any type of vehicle for the installation of a hitch, tow bar or the like to the vehicle so as to permit towing of the vehicle in either a forwardly or rearwardly facing orientation.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An assembly for adjusting the relationship of first and second portions of a vehicle relative to each other for transport, the first portion of the vehicle including a pair of ground engaging wheels, the assembly comprising a main frame; means mounted on the main frame for attachment to the first portion of the vehicle at a first point of reference, said attachment means including a pair of receptacles and members borne by the main frame individually to receive the wheels of said pair of wheels of the vehicle and being adjustable toward and from each other laterally of the frame in opposite directions to match the distance between said wheels, each member engageable with its respective wheel when received in the receptacle to capture said wheel therein; a subframe borne by the main frame extending to a second point of reference spaced from said first point of reference; and means mounted on the frame and extending to the second point of reference for engaging the second portion of the vehicle between said points of reference to adjust the first and second portions of the vehicle relative to each other.

2. An assembly for adjusting the relationship of first and second portions of a vehicle relative to each other for transport, the assembly comprising a main frame; means mounted on the main frame for attachment to the first portion of the vehicle at a first point of reference; a subframe borne by the main frame extending to a second point of reference spaced from said first point of reference; and means mounted on the frame and extending to the second point of reference for engaging the second portion of the vehicle between said points of reference to adjust the first and second portions of the vehicle relative to each other, said subframe being mounted on the main frame at a point longitudinally between the point of engagement of the engaging means with the second portion of the vehicle and said first point of reference and vertically below said second point of reference.

3. An assembly for adjusting the wheels and body of a vehicle to be towed relative to each other for transport in trailing relation to a towing vehicle, the assembly comprising:
  A. a frame having a longitudinal axis and a pair of arms telescopically extendable and contractable laterally of and on opposite sides of said longitudinal axis;
  B. housings individually mounted on the distal ends of the arms, each having a chamber disposed to receive therewithin a wheel of the vehicle to be towed;
  C. belts individually mounted on the housings for extension about the respective wheels received within the respective chambers thereof, the belts having free ends adapted to be secured on their respective housings individually to capture the wheels within the chambers of the housings;
  D. a belt assembly mounted on the frame in spaced relation to the pair of arms and extendable through the doorways of the vehicle to be towed and about the floor thereof to mount the frame beneath the vehicle to be towed with the wheels received in the chambers of the housings;
  E. a mast borne by the frame in upstanding relation on the opposite side of the pair of arms from the belt assembly and having a bar extending transversely of the longitudinal axis of the main frame; and
  F. a pair of suspension assemblies having flexible belts with end portions individually secured on the main frame adjacent to the housings thereof and individually extending therefrom to the mast and over the bar thereof with reel mechanisms mounting the belts on the mast so as to be operable to draw the belts over the bar to tension the belts for engagement with the body of the vehicle to be towed with wheels captured in the chambers of the housings substantially to maintain a selected spacing between said body and wheels during transport.

4. An assembly for attachment to a vehicle having wheels and a body, for transport, the assembly comprising:
  A. a frame having portions extending laterally thereof on opposite sides;
  B. receptacles individually mounted on said laterally extending portions of the frame, each receptacle disposed to receive therein a wheel of the vehicle to be transported;
  C. means for securing said wheels in the receptacles with at least a portion of the frame beneath said vehicle;
  D. means mounted on the frame remote from the receptacles for fastening the frame on the vehicle; and
  E. a suspension assembly mounted on the frame on the opposite side of the receptacles from the fastening means operable to engage the body of the vehicle to retain the body in a selected position relative to the wheels.

* * * * *